United States Patent

[11] 3,587,243

[72] Inventors Robert A. Keller
Smithtown;
Wayne L. McGough, Lyndenhurst; Henry C. Sutton, Jr., Huntington Station, all of N.Y.
[21] Appl. No. 828,939
[22] Filed May 29, 1969
[45] Patented June 28, 1971
[73] Assignee Grumman Aerospace Corporation

[54] PRECONDENSING REGENERATIVE AIR CYCLE SYSTEM
19 Claims, 1 Drawing Fig.
[52] U.S. Cl. ................................................ 62/87, 62/402, 62/93
[51] Int. Cl. .................................................. F25b 9/00
[50] Field of Search ........................................ 62/402, 86, 172, 93, 87, 88

[56] References Cited
UNITED STATES PATENTS

| | | | |
|---|---|---|---|
| 2,585,570 | 2/1952 | Messinger | 62/402 |
| 2,704,925 | 3/1955 | Wood | 62/172 |
| 2,809,714 | 10/1957 | Sims | 62/402X |
| 2,835,340 | 5/1958 | McGuff | 62/93 |
| 2,902,836 | 9/1959 | Lemay | 62/172 |
| 2,917,288 | 12/1959 | Sims | 62/402 |
| 2,979,916 | 4/1961 | Mason | 62/172 |
| 3,093,470 | 6/1963 | Melekian | 62/402 |

Primary Examiner—William J. Wye
Attorney—Morgan, Finnegan, Durham & Pine

ABSTRACT: An apparatus and process for providing dehumidified, conditioned air for ground cooling of aircraft weapons systems equipment. An air conditioning system adapted to dehumidify and cool pressurized air by sequentially passing pressurized source air through a primary heat exchanger, moisture removal equipment, the hot side of a regenerative heat exchanger, additional moisture removal equipment, an expansion turbine and the cold side of the regenerative heat exchanger.

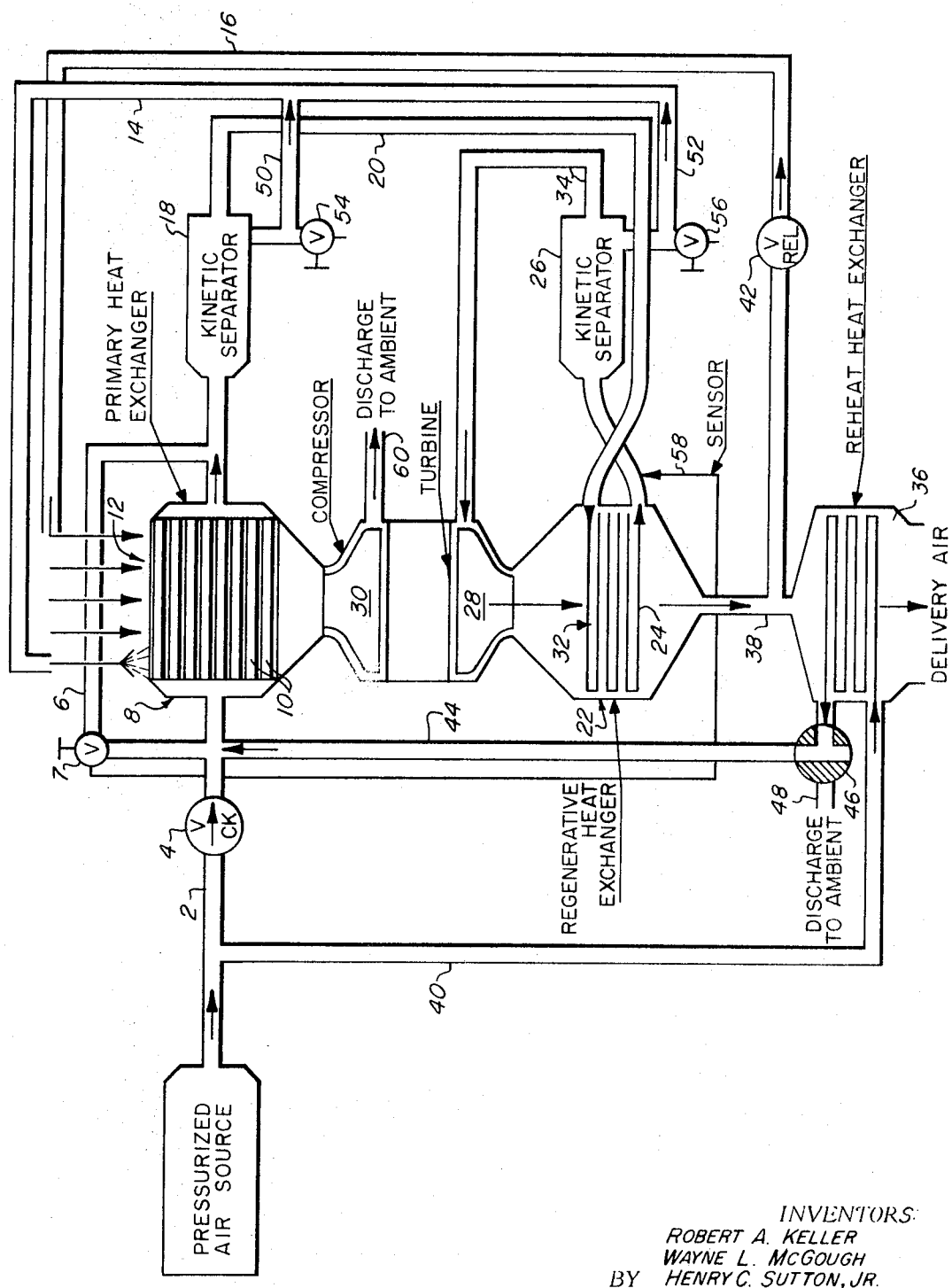

3,587,243

PRECONDENSING REGENERATIVE AIR CYCLE SYSTEM

FIELD OF THE INVENTION

The invention relates to an apparatus and a process for dehumidifying and cooling pressurized air. More specifically, the invention is directed to providing a system for delivering dry cooling air to complex electronic weapons systems carried by aircraft. The system has particular application in conditioning pressurized air from a jet engine starter unit for ground cooling of complex aircraft electronic weapons systems.

BACKGROUND OF THE INVENTION

Description of the Prior Art

At the present time, many aircraft carry complex electronic equipment which must be maintained at a relatively cool temperature while in use. In particular, the present and anticipated generations of military aircraft must be designed to carry a considerable amount of complex electronic weapons systems equipment that require cooling during operative periods. The electronic equipment must be cooled with dry air (no entrained moisture) since many of the electronic components will fail or rapidly deteriorate if subjected to moisture.

Although the electronic equipment carried by aircraft is designed for in-flight use, the equipment must be tested while the aircraft is on the ground. In addition, repair of the electronic equipment is also performed on the ground. Hence, the equipment must be operated during testing and servicing while the aircraft is on the ground.

Most of the aircraft carrying electronic equipment having cooling systems adapted to cool the electronic equipment during use in flight. However, the in-flight cooling systems are generally designed to rely on the aircraft power plant as a source for pressurized air. As a consequence, the use of the in-flight cooling systems is economically prohibitive for ground cooling of the electronic equipment.

Presently, several means for effective ground cooling of the complex electronic equipment found in most aircraft are available. One of the more prominently used cooling means is the air cycle ground cooling system. The air cycle ground cooling system includes heat exchange apparatus in combination with expansion turbines which perform the function of cooling pressurized air for delivery to cool the electronic equipment. Essentially, the air cycle ground cooling system is comprised of air cooling equipment and moisture removal equipment located downstream thereof. Basically, a primary heat exchanger is arranged in series with an expansion turbine.

The natural condensation formed during the expansion process across the cooling turbine is discharged as a super fine mist with particle sizes in the micronic range. Physical separation of the condensate is extremely difficult due to the fine particulate size of the mist. In order to remove the water, these particles must first be coalesced into relatively large droplets which can then be removed from the system mechanically. In practice, currently available coalescing devices are capable of efficiencies in the order of 60 percent (maximum). Hence, when the presently available coalescers are used significant quantities of entrained water remains in the system cooling air delivered to the environment being cooled. This water is carried through the system and, unless evaporated through the addition of heat, is ultimately delivered to the equipment being cooled.

SUMMARY OF THE INVENTION

It is an object of the present invention to provide a system for delivering cool, dry air to an environment which must be cooled.

It is a more specific object of the present invention to provide an apparatus and method for ground cooling of electronic equipment carried on aircraft.

It is a further object of the present invention to provide an inexpensive, simplified water removal system to convert moist pressurized air to dry cooling air for complex electronic weapons systems.

It is also an object of the present invention to provide an air drying process using regenerative heat exchange principles and upstream moisture removal equipment to deliver dry air to an expansion turbine for final cooling.

To this end, a system is provided for conditioning pressurized air to cool electronic equipment. Basically, the system uses a primary heat exchanger, a regenerative heat exchanger and an expansion turbine to cool pressurized air and moisture removal means to dry the air.

Initially, pressurized air is passed through the hot side of a primary heat exchanger which uses ambient air to cool the pressurized air. The cooled pressurized air issuing from the primary heat exchanger which contains free water droplets is then passed through a kinetic water separator wherein the free water is removed. The conditioned air is next passed through the hot side of the regenerative heat exchanger wherein it is further cooled to produce additional free water droplets. The conditioned air is next passed to a second kinetic separator wherein the additional free water is removed from the cooled or conditioned air. The relatively dry air is introduced into the expansion turbine wherein further cooling of the air is effected. The cool, dry air is finally discharged from the expansion turbine through the cold side of the regenerative heat exchanger wherein it is reheated to provide the enthalpy balance necessary for system operation.

A final reheat or normalizing heat exchanger can be provided in the system to afford accurate temperature control of the conditioned air prior to delivery into the environment of the equipment to be cooled. In addition, a system control bypass means is provided to prevent the regenerative heat exchanger discharge from falling below a critical temperature.

In addition, means to spray the moisture removed from the pressurized air to the cold side of the primary heat exchanger to improve efficiency is provided in the system.

DESCRIPTION OF THE DRAWING

The invention will be described with reference to the accompanying drawing which will give a clearer understanding of the invention and preferred method of practicing the invention. The drawing is a schematic diagram of the air cooling and conditioning system of the invention.

DESCRIPTION OF THE PREFERRED EMBODIMENT

The circuit depicted in the drawing is the preferred embodiment of the invention. The invention contemplates conditioning pressurized air from a suitable source to be used as unsaturated air for ground cooling purposes. The source of pressurized air can be any air pressurizing means. However, in practice, it has been found most convenient to use high temperature air delivered by a conventional pneumatic jet engine starter unit.

In general, the system includes moisture removal apparatus and cooling apparatus comprised of heat exchangers and an expansion turbine.

More specifically, the air cooling and conditioning system includes a duct 2 which connects the source of pressurized air to a primary heat exchanger 8. The duct 2 may be provided with a check valve 4 to insure unidirectional flow to the hot side of the primary heat exchanger 8.

A duct 6 having a thermostatically operated valve 7 is provided to afford a bypass around the primary heat exchanger 8 for the source air.

The primary heat exchanger 8 is provided with a hot side comprised of tubes 10 into which the pressurized air passes from duct 2 and a cold side 12 through which ambient sink air is drawn to cool the pressurized air in the hot side tubes 10. A condensate spray line 14 and a system bypass duct 16 are also provided. Both the condensate from line 14 and the cool air from bypass duct 16 can be used to aid in cooling the air passing through the heat exchanger hot side tubes 10 if needed. It is to be noted that the primary heat exchanger 8 can be any typical heat exchanger presently in use; however, a tubular heat exchanger is shown for illustrative purposes.

A first kinetic separator 18 is arranged to receive the cooling air as it discharges from the primary heat exchanger 8. The kinetic separator 18 operates to remove free moisture from the cooling air. Basically, the kinetic separator 18 is typical in construction and is designed to remove moisture by a centrifuge process. Similar moisture removal equipment can be used to perform the dehumidifying operation at this point; however, practice has taught that a kinetic separator is particularly suitable for use in the system of the present invention due to the nature of the moisture (free water) present at this point.

A regenerative heat exchanger 22 is provided in the system to further cool the cooling air after it has been discharged from the first kinetic separator 18. The regenerative heat exchanger 22 has a hot side 24 and a cold side 32. A duct 20 is adapted to connect the inlet of the hot side 24 directly with the first kinetic separator 18. The cold side 32 of the regenerative heat exchanger 22 is coupled with the discharge of an expansion turbine 28 located between the hot side 24 and the cold side 32 of the regenerative heat exchanger 22. In the regenerative heat exchanger 22, the cooling air passes in heat exchange relationship with itself. The regenerative heat exchanger hot side 24 is upstream in the cooling system relative to the cold side 32; consequently, the cooling air passing therethrough is warmer than the cooling air passing through the cold side 32. The regenerative heat exchanger 22 can be of any typical heat exchanger design adaptable for regenerative heat exchange and is shown as having a hot side comprised of a multipass serpentine coil merely for illustrative purposes.

A second kinetic separator 26, essentially the same structurally as the first kinetic separator 18, is used to remove additional free water from the cooling air discharging from the hot side 24 of the regenerative heat exchanger 22.

An expansion turbine 28 coupled to a compressor 30 is located in the system immediately downstream of the kinetic separator 26. A duct 34 connects the kinetic separator 26 to the expansion turbine 28.

The expansion turbine 28 is designed to further cool the cooling air by extracting heat energy therefrom. Energy extracted from the cooling air by its passage through the expansion turbine 28 is converted to work energy by the turbine 28 and used to drive the compressor 30. The compressor 30 is adapted to draw the ambient sink air through the cold side of the primary heat exchanger 8 and discharge the heated air to the atmosphere through the duct 60.

A duct 38 is provided to convey the conditioned cooling air from the regenerative heat exchanger cold side 32 to additional conditioning equipment or to the ultimate cooling environment.

The system also includes a bypass duct 16 through which conditioned cooling air from the regenerative heat exchanger discharge duct 38 is returned to the cold side of the primary heat exchanger 8. A relief valve 42 is located in the bypass duct 16 to insure that a maximum pressure in the duct 38 is not exceeded. In addition to providing pressure regulation, this air can be utilized to supplement cold air flow in the primary heat exchanger 8. In practice, it has been found that the pressure of the cooling air entering the environment of the electronic equipment should be kept at a pressure of 3 p.s.i.g. or below. However, the specific cooling application will dictate the maximum allowable pressure.

Line 14 is provided in the system to return condensate from the conditioned air to the cold side of the primary heat exchanger 8. Lines 50 and 52 extend from the liquid drain of the kinetic separators 18 and 26, respectively to the condensate return line 14. The condensate returned to the cold side of the primary heat exchanger 8 improves the cooling capability of the primary heat exchanger. It should be noted that condensate from another source can be used to improve the efficiency of the primary heat exchanger. The lines 50 and 52 have condensate valves 54 and 56 respectively which can be opened to dump accumulated condensate which is not needed for spraying on the cold side of the primary heat exchanger 8.

A reheat or normalizing heat exchanger 36 is provided in the system to heat the cooling air leaving the regenerative heat exchanger 22, if necessary. Heat can be supplied to the reheat heat exchanger from the same source as the source for the cooling air. A duct 40 can be arranged to extend from duct 2 to the hot side of the reheat heat exchanger 36. A duct 44 provided with a control valve 46 can be provided to return the heating air from the reheat heat exchanger 36 to duct 2 to be conditioned for use as the equipment cooling air. Alternatively, the heating air could be exhausted to the atmosphere through line 48. By returning the service air from the reheat heat exchanger 36 to the air cooling system, the system efficiency is improved since the reheat heat exchanger 36 can be made to serve the dual function of heating conditioned cooling air and precooling system source air. The valve 46 can be located at any point in the line to selectively interrupt flow to the reheat heat exchanger 36; however, practice has taught that location in line 44 provides the most efficient system.

The system also includes a temperature sensor 58 located at the discharge of the hot side of regenerative heat exchanger 22. The sensor 58 controls valve 7 to open and close the duct 6 which ultimately determines the temperature of the cooling air entering the kinetic separator 26. Temperature control is necessary at this point in the system to prevent blocking of the regenerative heat exchanger 22 and the second kinetic separator 26 due to ice formation. In practice, it has been found that 35° F. is a good temperature control point to prevent blocking of the regenerative heat exchanger 22 and the kinetic separator 26. If the temperature at the sensor 58 drops below 35° F., the valve 7 will open to allow the source air to flow around the primary heat exchanger 8 through duct 6. As a consequence, the temperature of the cooling air leaving the hot side 24 of the regenerative heat exchanger will increase. When the temperature rises above 35° F., the sensor will signal the valve 7 to close. It should be noted that the optimum temperature control point will vary depending on the cooling gas used.

In operation, the pressurized air from a suitable source, such as a jet engine starter, is passed through duct 2 to the hot side of the primary heat exchanger 8. Simultaneously, ambient sink air and, if needed, condensate spray and system bypass air are drawn through the cold side of the primary heat exchanger 8 by the compressor 30. The ambient sink air, condensate spray and system bypass air used to cool the source air in the primary heat exchanger 8 are passed through the compressor 30 and discharged through duct 60 to the atmosphere.

The cooled pressurized air is next passed from the hot side of the primary heat exchanger 8 to the first kinetic separator 18 wherein free water is removed. The water is either dumped or returned to the sold side of the primary heat exchanger 8 through ducts 50 and 14. The cooled pressurized air is now partially dehumidified and is passed from the kinetic separator 18 through the duct 20 to the hot side 24 of the regenerative heat exchanger 22. Cooling air from the expansion turbine 28 is passed through the cold side of the regenerative heat exchanger 22 to cool the air in the hot side 24 for the purpose of producing additional free water.

The conditioned air leaves the hot side of the regenerative heat exchanger 22 and passes through the second kinetic separator 26 wherein the additional free water is removed. The water removed from the cooling air in the second kinetic separator 26 can be drained through valve 56 or returned by ducts 52 and 14 to the cold side of the primary heat exchanger 8. The conditioned air from the second kinetic separator 26 is then passed through the expansion turbine 28 wherein the temperature is further decreased. The cold conditioned air discharging from the turbine 28 passes through the cold side 32 of the regenerative heat exchanger 22 wherein it is reheated by its passage in heat exchange relationship with the air passing through the hot side coil 24.

The conditioned air in line 38 is now at a relatively low pressure and a temperature of about 50° F. or less. The conditioned air is passed from line 38 through the reheat or normalizing heat exchanger 36 wherein it can be heated to the final desired temperature.

If the pressure in duct 38 is above the setting of the relief valve 42 in the bypass duct 16, the valve will open and automatically bleed the system until the desired pressure is attained.

The present invention has been described referring to air as the gas being conditioned for cooling purposes. It should be noted that virtually any gas can be conditioned by the apparatus of the present invention.

We claim:

1. An apparatus for generating cooling gas, free of entrained moisture comprising:
   a source of pressurized gas to be converted to cooling gas;
   means for initially cooling the source gas;
   means for removing moisture from the cooled gas which issues from the first means for initially cooling the source gas;
   a regenerative heat exchanger having a hot side and a cold side, the hot side of which is adapted for the passage therethrough of the cooling gas from the source of pressurized gas;
   means to remove moisture from the cooling gas discharged from the hot side of the regenerative heat exchanger;
   an expansion turbine for further cooling the cooling gas issuing from the moisture removal means; and
   means to direct the cooling gas from the expansion turbine through the cold side of the regenerative heat exchanger.

2. An apparatus as in claim 1 wherein the means to initially cool the cooling air is a primary heat exchanger having a hot side for the passage of the source gas therethrough and a cold side and; further comprising a compressor coupled to the expansion turbine to be driven thereby; which compressor is adapted to draw ambient air through the cold side of the primary heat exchanger.

3. An apparatus as in claim 1 wherein the means to initially cool the cooling gas is a primary heat exchanger having a hot side for the passage of the source gas therethrough and a cold side and; further comprising a compressor coupled to the expansion turbine to be driven thereby; which compressor is adapted to draw ambient air through the cold side of the primary heat exchanger.

4. An apparatus as in claim 1 further comprising means to reheat the cooling gas discharged from the cold side of the regenerative heat exchanger.

5. An apparatus as in claim 3 further comprising means to reheat the cooling gas discharged from the cold side of the regenerative heat exchanger.

6. An apparatus as in claim 1 further comprising means to regulate the pressure of the cooling gas being discharged from the cold side of the regenerative heat exchanger.

7. An apparatus as in claim 5 further comprising means to regulate the pressure of the cooling gas being discharged from the cold side of the regenerative heat exchanger.

8. An apparatus as in claim 7 further comprising means to return moisture from the moisture removal means to the cold side of the primary heat exchanger.

9. An apparatus as in claim 8 further comprising means to return system cooling gas to the cold side of the primary heat exchanger.

10. An apparatus as in claim 5 wherein the means to heat the cooling gas being discharged from the cold side of the regenerative heat exchanger is comprised of:
    a reheat heat exchanger having a hot side and a cold side;
    means to deliver pressurized gas from the source from which the cooling gas originally emanates to the hot side of the reheat heat exchanger;
    means for returning the gas discharged from the hot side of the reheat heat exchanger to the inlet of the hot side of the primary heat exchanger; and
    means for regulating the flow of gas through the hot side of the reheat heat exchanger.

11. An apparatus as in claim 10 further comprising means to selectively bypass source air around the hot side of the primary heat exchanger.

12. An apparatus as in claim 11 wherein the cooling gas is air.

13. A process for cooling and conditioning pressurized gas to be used as cooling gas comprising the steps of:
    initially cooling the pressurized gas in a primary heat exchanger;
    initially removing moisture from the cooled gas issuing from the primary heat exchanger;
    further cooling the gas after the initial moisture removal by passage thereof through the hot side of a regenerative heat exchanger;
    removing further moisture from the cooling gas after it issues from the hot side of the regenerative heat exchanger;
    passing the cooled dehumidified gas through an expansion turbine to further cool and gas; and
    passing the cooled gas, after it issues from the expansion turbine, through the cold side of the regenerative heat exchanger.

14. A process as in claim 13 wherein the cooling gas is air.

15. A process as in claim 14 further comprising the additional step of heating the cooling air prior to delivery to the environment to be cooled.

16. A process as in claim 15 further comprising the step of recirculating a portion of the cooling air to pass in indirect heat exchange relationship with the warm source air in the primary heat exchanger.

17. A process as in claim 16 further comprising the steps of returning the moisture removed from the cooling air to the cold side of the primary heat exchanger and spraying the moisture into the cold side of the heat exchanger.

18. A process as in claim 16 further comprising the step of regulating the pressure of the cooling air after passage thereof through the cold side of the regenerative eat exchanger.

19. A process as in claim 18 wherein the cooling air is to be used for cooling electronic equipment and is at a temperature of 50° F. and a pressure of 3 p.s.i.g.